(12) United States Patent
Koito et al.

(10) Patent No.: US 9,041,886 B2
(45) Date of Patent: May 26, 2015

(54) LIQUID CRYSTAL DISPLAY DEVICE AND MANUFACTURING METHOD OF LIQUID CRYSTAL DISPLAY DEVICE

(71) Applicant: Japan Display West Inc., Chita-gun (JP)

(72) Inventors: Takeo Koito, Kanagawa (JP); Hiroshi Nishikawa, Kanagawa (JP)

(73) Assignee: Japan Display, Inc, Tokyo (JP)

( * ) Notice: Subject to any disclaimer, the term of this patent is extended or adjusted under 35 U.S.C. 154(b) by 53 days.

(21) Appl. No.: 14/035,345

(22) Filed: Sep. 24, 2013

(65) Prior Publication Data

US 2014/0024156 A1    Jan. 23, 2014

Related U.S. Application Data

(62) Division of application No. 11/986,012, filed on Nov. 19, 2007, now Pat. No. 8,576,369.

(30) Foreign Application Priority Data

Dec. 20, 2006 (JP) .................................. 2006-342139

(51) Int. Cl.
| G02F 1/1335 | (2006.01) |
| G02F 1/1339 | (2006.01) |
| G02F 1/1333 | (2006.01) |
| G02F 1/1337 | (2006.01) |
| G02F 1/139 | (2006.01) |
| G02F 1/1343 | (2006.01) |

(52) U.S. Cl.
CPC ........ *G02F 1/1333* (2013.01); *G02F 1/133707* (2013.01); *G02F 1/1393* (2013.01); *G02F 2001/134345* (2013.01)

(58) Field of Classification Search
USPC .................................................. 349/114, 155
See application file for complete search history.

(56) References Cited

U.S. PATENT DOCUMENTS

| 7,480,022 | B2 * | 1/2009 | Tsuchiya et al. ............... 349/123 |
| 7,495,727 | B2 | 2/2009 | Oizumi et al. |
| 2004/0233359 | A1 | 11/2004 | Nam et al. |
| 2005/0117097 | A1 | 6/2005 | Noguchi et al. |
| 2005/0140916 | A1 | 6/2005 | Kume et al. |
| 2005/0200784 | A1 | 9/2005 | Kume et al. |

(Continued)

FOREIGN PATENT DOCUMENTS

| JP | 63-21907 | 5/1985 |
| JP | 10-186330 | 7/1998 |

(Continued)

*Primary Examiner* — Huyen Ngo
(74) *Attorney, Agent, or Firm* — Robert J. Depke; The Chicago Technology Law Group, LLC

(57) ABSTRACT

Disclosed herein is a liquid crystal display device including a plurality of pixels each having a reflecting section and a transmitting section, the pixels each including a plurality of sub-pixels resulting from alignment division, the liquid crystal display device including: an element layer formed on a substrate; an insulating film formed on the substrate so as to cover the element layer; a pixel electrode formed on the insulating film so as to be connected to the element layer; a gap adjusting layer formed on the insulating film on the element layer including a region of connection between the element layer and the pixel electrode; and a dielectric formed on a connecting part for making an electric connection between the sub-pixels.

6 Claims, 13 Drawing Sheets

(56) References Cited

U.S. PATENT DOCUMENTS

| | | |
|---|---|---|
| 2006/0050210 A1* | 3/2006 | Tsuchiya ............... 349/114 |
| 2006/0125984 A1 | 6/2006 | Park et al. |
| 2006/0125986 A1 | 6/2006 | Choo et al. |
| 2007/0146591 A1 | 6/2007 | Kimura et al. |
| 2007/0153213 A1* | 7/2007 | Huang et al. ............ 349/155 |
| 2008/0043184 A1 | 2/2008 | Tung et al. |
| 2009/0161049 A1* | 6/2009 | Onishi et al. ........... 349/114 |

FOREIGN PATENT DOCUMENTS

| | | |
|---|---|---|
| JP | 2002-00742 | 3/2002 |
| JP | 2004-317611 | 11/2004 |
| JP | 2005-266778 | 9/2005 |
| JP | 2005-275213 | 10/2005 |
| JP | 2005-331675 | 12/2005 |
| JP | 2006-003830 | 1/2006 |
| JP | 2006-178450 | 7/2006 |
| JP | 2006-221055 | 8/2006 |

* cited by examiner

LIQUID CRYSTAL DISPLAY DEVICE AND MANUFACTURING METHOD OF LIQUID CRYSTAL DISPLAY DEVICE

CROSS REFERENCES TO RELATED APPLICATIONS

The subject matter of application Ser. No. 11/986,012, is incorporated herein by reference. The present application is a Divisional of U.S. Ser. No. 11/986,012, filed Nov. 19, 2007, which claims priority to Japanese Patent Application JP 2006-342139 filed in the Japanese Patent Office on Dec. 20, 2006, the entire contents of which being incorporated herein by reference.

BACKGROUND OF THE INVENTION

1. Field of the Invention

The present invention relates to a liquid crystal display device and a method of manufacturing the liquid crystal display device.

2. Description of the Related Art

The liquid crystal display device has been used as a display element for various purposes because the liquid crystal display device has advantages of small thickness, light weight, and low power consumption. Recently, the uses of the liquid crystal display device have ranged widely from large television sets for household use to small portable terminals, and increasingly severe characteristics have been demanded of display elements.

There has been a growing demand especially for a wider viewing angle.

Accordingly, in place of a TN mode in related art, an IPS (In-Plane Switching) mode of a horizontal electric field system (see Japanese Patent Laid-Open No. Sho 63-21907, for example), a VA (Vertical Alignment) mode (MVA) in which multi-domain alignment is performed (see Japanese Patent Laid-Open No. Hei 10-186330, for example), and the like have been proposed.

Of these modes, the VA mode typified by MVA is a mode of high productivity because liquid crystal molecules are aligned perpendicularly to a substrate, and thus a high CR is easily obtained and a cell gap control margin is wide, for example. A method is disclosed in which a dielectric structure is provided as means for divided alignment in a pixel part, or a notch or a slit is provided in a transparent electrode (for example ITO: Indium Tin Oxide) part of a pixel, whereby the alignment of liquid crystal molecules is controlled using a resulting oblique electric field (see Japanese Patent Laid-Open No. 2005-266778, for example).

Accordingly, as shown in a plan layout schematic view of FIG. 10A and a sectional view of principal parts of FIG. 10B, notches are made in pixel electrodes 12 and 32 within one pixel 40, whereby the pixel 40 is divided into a plurality of sub-pixels. An alignment control factor (for example a dielectric structure) 34 or the like for alignment control is disposed in such a manner as to be situated at the center of each of the divided sub-pixels 50 (51, 52, and 53) on a pixel electrode (common electrode) 32 on a counter side. Thereby liquid crystal molecules can be aligned radially with the alignment control factors 34 provided on the pixel electrode 32 as a center within the sub-pixels 50. Because the liquid crystal molecules 22 are aligned radially, change in luminance as viewed from the direction of an azimuth angle is reduced, and thus a wide viewing angle performance is obtained.

However, when one pixel is divided into a plurality of sub-pixels, the sub-pixels need to be electrically connected to each other. The above-mentioned document discloses a method of leaving a pixel electrode (common electrode) at the central part of the sub-pixels. According to this method, while the direction of alignment is controlled by the alignment control factors provided on the counter electrode within the sub-pixels, the electric connecting parts are in a state of weak alignment control. When the liquid crystal panel is pressed, for example, the alignment is disordered as shown in a photograph of FIG. 11B. The alignment of liquid crystal molecules at a connecting part falls in a direction different from that before the surface pressing, and therefore the alignment of the sub-pixel is disordered, resulting in an alignment defect. Incidentally, a photograph of FIG. 11A shows that alignment disorder does not occur in a state in which the surface of the liquid crystal panel is not pressed.

That is, as shown in FIGS. 10A and 10B, a pixel in related art needs to have a pixel electrode (connecting part) for an electric connection between sub-pixels. However, because of absence of a factor defining the alignment of the connecting part, the state of the alignment becomes unstable. When the alignment is forcedly disordered by surface pressing or the like, the alignment does not return from the state of the alignment disorder.

FIG. 12 is a schematic diagram of an example of alignment disorder. Thus, liquid crystal molecules 22 do not return from a state of alignment disorder. Therefore a phenomenon representing a display abnormality in which a mark is left in the panel is observed. This phenomenon of the display abnormality can be alleviated by increasing a distance between sub-pixels 50. However, when the distance between the sub-pixels 50 is increased, a problem of a decrease in transmittance occurs.

SUMMARY OF THE INVENTION

In related art, there is the display abnormality in which a mark is left in a panel because the alignment of a liquid crystal does not return from a state of alignment disorder to a normal state when the alignment is disordered once by pressing the liquid crystal panel, for example.

It is desirable to suppress the alignment disorder of a liquid crystal due to surface pressing, which means that the display surface of the liquid crystal display device is pressed, by making each of sub-pixels into which a pixel is divided one electrically independent pixel.

According to a first embodiment of the present invention, there is provided a liquid crystal display device including a plurality of pixels each having a reflecting section and a transmitting section, the pixels each including a plurality of sub-pixels resulting from alignment division, the liquid crystal display device including: an element layer formed on a substrate; an insulating film formed on the substrate so as to cover the element layer; a pixel electrode formed on the insulating film so as to be connected to the element layer; a gap adjusting layer formed on the insulating film on the element layer including a region of connection between the element layer and the pixel electrode; and a dielectric formed on a connecting part for making an electric connection between the sub-pixels; wherein the reflecting section is formed by a region having the element layer, the insulating film covering the element layer, and the gap adjusting layer formed on the insulating film, the transmitting section is formed by a region having the pixel electrode formed on the insulating film excluding a region where the gap adjusting layer is formed, and the dielectric is formed on the pixel electrode in the transmitting section.

In the first embodiment of the present invention, the dielectric is formed on the electric connecting part between the sub-pixels. Thereby the alignment disorder of a liquid crystal, which disorder is caused when the liquid crystal panel is pressed, does not occur easily. Further, by forming the dielectric without increasing the number of processes, a decrease in productivity due to the formation of the dielectric is avoided.

According to a second embodiment of the present invention, there is provided a method of manufacturing a liquid crystal display device, the liquid crystal display device including a plurality of pixels each having a reflecting section and a transmitting section, the pixels each including a plurality of sub-pixels resulting from alignment division, the method including the steps of: forming an element layer on a substrate; forming an insulating film on the substrate such that the insulating film covers the element layer; forming a pixel electrode on the insulating film such that the pixel electrode is connected to the element layer; and forming a gap adjusting layer on the insulating film on the element layer including a region of connection between the element layer and the pixel electrode; wherein the reflecting section is formed by a region having the element layer, the insulating film, and the gap adjusting layer, the transmitting section is formed by a region having the pixel electrode formed on the insulating film excluding a region where the gap adjusting layer is formed, and a dielectric is formed on the pixel electrode in the transmitting section and a connecting part for making an electric connection between the sub-pixels.

The second embodiment of the present invention has the step of forming the dielectric on the connecting part for making an electric connection between the sub-pixels. The sub-pixels can therefore be formed in a state of being electrically independent of each other. Hence, the alignment of a liquid crystal can be stabilized. Thus, even when the alignment of the liquid crystal is disordered once by pressing the liquid crystal panel, the alignment of the liquid crystal immediately returns to an original state. Therefore a liquid crystal display device that eliminates a display defect of a mark being left by pressing the surface of the liquid crystal panel is manufactured. Further, by forming the dielectric without increasing the number of processes, a decrease in productivity due to the formation of the dielectric is avoided.

The first embodiment of the present invention eliminates a display defect caused by pressing the surface of the liquid crystal panel, and thus has an advantage of being able to improve display quality. In addition, the dielectric formed on the connecting part for making an electric connection between the sub-pixels and an alignment control factor for controlling the alignment of a liquid crystal, which alignment control factor is formed in each sub-pixel, can be minimized in size, so that transmittance can be improved. Further, in related art, a substrate interval (a so-called cell gap) needs to be reduced to enhance resistance to surface pressing. However, because the resistance to surface pressing is improved, the substrate interval can be increased. Therefore a transmittance characteristic can be improved.

The second embodiment of the present invention eliminates a display defect caused by pressing the surface of the liquid crystal panel, and thus has an advantage of being able to manufacture a liquid crystal display device that can improve display quality. In addition, the dielectric formed on the connecting part for making an electric connection between the sub-pixels and an alignment control factor for controlling the alignment of a liquid crystal, which alignment control factor is formed in each sub-pixel, can be minimized in size, so that a liquid crystal display device that can improve transmittance can be manufactured. Further, in related art, a substrate interval (a so-called cell gap) needs to be reduced to enhance resistance to surface pressing. However, because the resistance to surface pressing is improved, the substrate interval can be increased. Therefore a liquid crystal display device having an improved transmittance characteristic can be manufactured.

DETAILED DESCRIPTION OF THE PREFERRED EMBODIMENTS

Figure 1A:
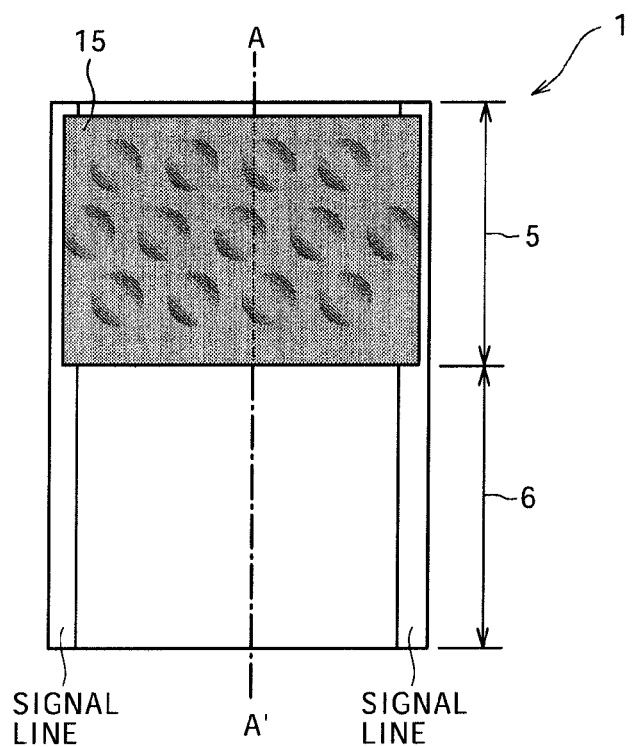
FIGS. 1A and 1B are drawings showing an embodiment (first embodiment) of a liquid crystal display device of the present invention according to claim 1, FIG. 1A being a plan view of an element side substrate of a liquid crystal cell for one pixel of the liquid crystal display device, and FIG. 1B being a sectional view taken along a line A-A' in FIG. 1A.
Figure 1B:
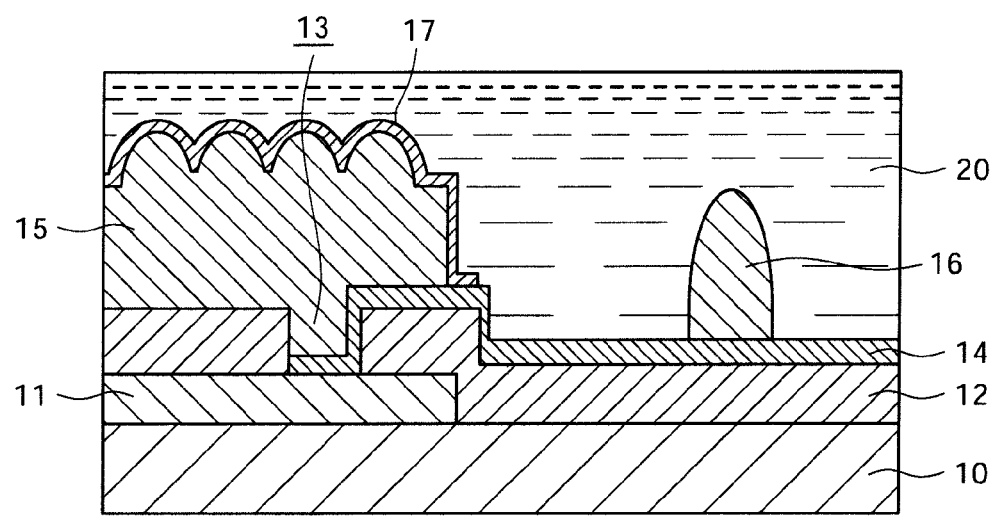
Figure 2:
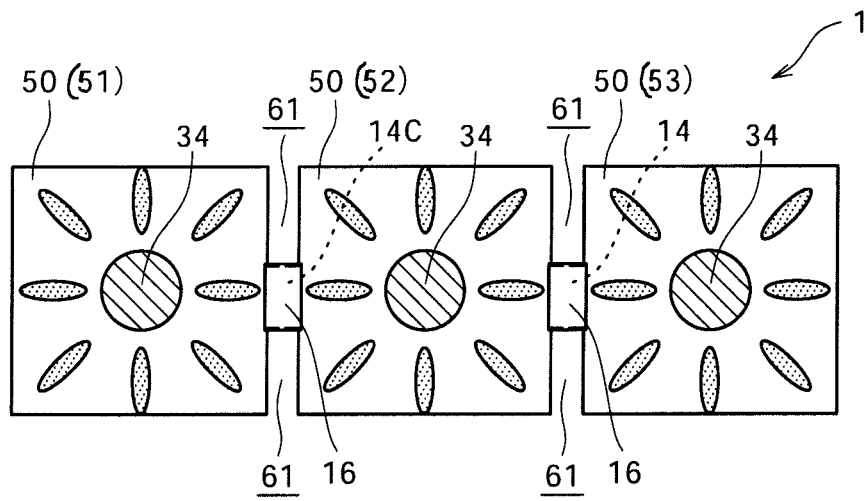
FIG. 2 is a plan layout schematic view of a pixel including a plurality of sub-pixels resulting from pixel division.

An embodiment (first embodiment) of a liquid crystal display device of the present invention according to claim 1 will be described with reference to FIGS. 1A, 1B and FIG. 2. FIGS. 1A and 1B are drawings showing semitransparent type liquid crystal display device as an example of the display device, FIG. 1A being a plan view of an element side substrate of a liquid crystal cell for one pixel of the liquid crystal display device, and FIG. 1B being a sectional view taken along a line A-A' in FIG. 1A. FIG. 2 is a plan layout schematic view of a pixel including a plurality of sub-pixels resulting from pixel division.

As shown in FIG. 1A and FIG. 2, the liquid crystal display device 1 has a liquid crystal layer 20 sealed in between a substrate 10 and a counter substrate (not shown) opposed to each other, and includes a plurality of pixels 40 for displaying an image, the pixels 40 having a reflecting section 5 and a transmitting section 6. Each of the pixels 40 includes a plurality of sub-pixels formed by alignment division, for example sub-pixels 50 (51, 52, and 53). An electric connection between the sub-pixels 50 is established by a pixel electrode 14 formed on the substrate 10. Notches 61, for example, are formed in the pixel electrode 14 between the sub-pixels 50. A dielectric 16 is formed on the pixel electrode 14 between the sub-pixels 50 (the pixel electrode 14 between the sub-pixels 50 will hereinafter be referred to as a connecting part 14C).

A pixel electrode is formed on the substrate (counter substrate) (not shown) opposed to the substrate 10 on a side where the dielectric 16 is formed. An alignment control factor 34 is formed on the pixel electrode (a surface on the liquid crystal 20 side) situated at the center of each of the sub-pixels 50. This alignment control factor 34 is formed by a dielectric, for example. In FIG. 2, a position where the alignment control factor 34 is formed is shown by projection.

A configuration of the liquid crystal display device 1 will be described concretely. As shown in FIG. 1E, an element layer 11 is formed on the substrate 10 on an element formation side. An insulating film 12 covering the element layer 11 is formed on the substrate 10. A contact hole 13 communicating with the element layer 11 is formed in the insulating film 12. The pixel electrode 14 connected to the element layer 11 via the contact hole 13 is formed on the insulating film 12. A gap adjusting layer 15 for adjusting the thickness of the liquid crystal 20 in the reflecting section 5 is formed on the insulating film 12 on the element layer 11 including a region of connection between the element layer 11 and the pixel electrode 14 with a part of the pixel electrode 14 interposed between the gap adjusting layer 15 and the insulating film 12. This gap adjusting layer 15 is formed by an organic insulating film or an inorganic insulating film, for example. Further, the dielectric 16 is formed at least on the connecting part 14C for electrically connecting between the sub-pixels 50.

Thus, the reflecting section 5 is formed by a region having the element layer 11, the insulating film 12 covering the element layer 11, and the gap adjusting layer 15 formed on the insulating film 12 with the part of the pixel electrode 14 interposed between the gap adjusting layer 15 and the insulating film 12. The upper surface of the gap adjusting layer 15 is formed in the shape of gentle irregularities, for example. The surface of the gap adjusting layer 15 thus formed in the shape of gentle irregularities improves a reflection characteristic. Incidentally, the gap adjusting layer 15 and the shape of the irregularities formed in the surface of the gap adjusting layer 15 may be formed continuously with an adjacent pixel. Further, a reflecting electrode 17 is formed on the gap adjusting layer 15. The thus formed reflecting electrode 17 enhances reflection on the gap adjusting layer 15. In addition, because the reflecting electrode 17 is connected to the pixel electrode 14 at an edge part of the gap adjusting layer 15, the reflecting electrode 17 has a function of a pixel electrode on the gap adjusting layer 15. The transmitting section 6 is formed by a region having the insulating film 12 formed on the substrate 10 excluding the reflecting section 5. The dielectric 16 is formed on the insulating film 12 in the transmitting section 6 with the pixel electrode 14 interposed between the dielectric 16 and the insulating film 12.

Because the liquid crystal display device 1 has the dielectric 16 at least on the connecting part 14C for electrically connecting between the sub-pixels 50, the sub-pixels 50 can be made electrically independent of each other. Therefore the alignment of the liquid crystal 20, especially the alignment of liquid crystal molecules 20 at the connecting part 14 can be stabilized.

Figure 3A:
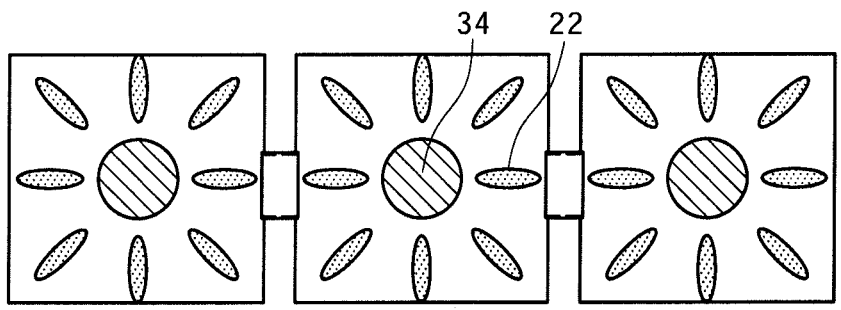
FIGS. 3A and 3B are plan layout schematic views of states of alignment of liquid crystal molecules before and after surface pressing.
Figure 3B:
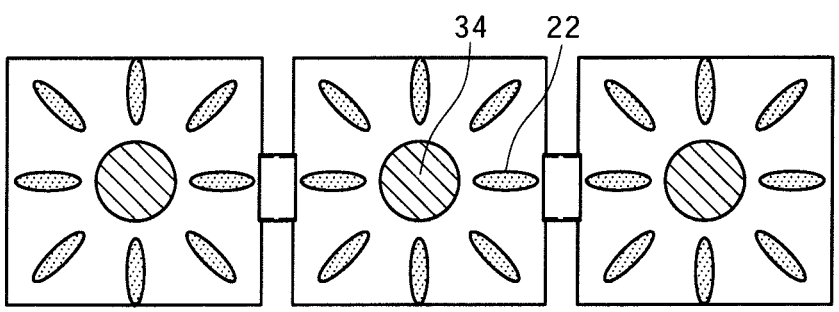

For example, as shown in FIG. 3A, liquid crystal molecules 22 in a state before the surface of the liquid crystal display panel is pressed are radially aligned with the alignment control factor 34 at a center. As shown in FIG. 3B, after the surface of the liquid crystal display panel is pressed, the liquid crystal molecules 22 immediately return to an original alignment state. Thus the liquid crystal molecules 22 are radially aligned with the alignment control factor 34 at the center, and an alignment defect or the like does not occur. Therefore, because the alignment of the liquid crystal molecules 22 is not disordered by the surface pressing, a display defect of a mark being left by pressing the surface of the liquid crystal panel is eliminated, so that an advantage of being able to improve display quality is obtained. Then, change in luminance as viewed from the direction of an azimuth angle is reduced, so that a wide viewing angle performance is obtained.

In addition, because the alignment of the liquid crystal molecules 22 is stabilized, while the pixel structure in related art needs for stability of the alignment that the pixel electrode 14 between the sub-pixels 50 have a certain length and that the alignment control factor 34 disposed on the counter side have a certain area, which has been a factor in decreasing transmittance, the size of the pixel electrode 14 and the alignment control factor 34 can be minimized by disposing the dielectric 16 on the connecting part 14 as in the present invention. Thereby the liquid crystal display device 1 can ensure a high transmittance. In addition, in related art, a substrate interval (a so-called cell gap) needs to be reduced to enhance resistance to surface pressing. However, because the resistance to surface pressing is improved, the substrate interval can be increased. Therefore a transmittance characteristic is improved.

In addition, by forming the dielectric 16 in the liquid crystal display device 1 without increasing the number of processes, a decrease in productivity due to the formation of the dielectric 16 is avoided.

Figure 4A:
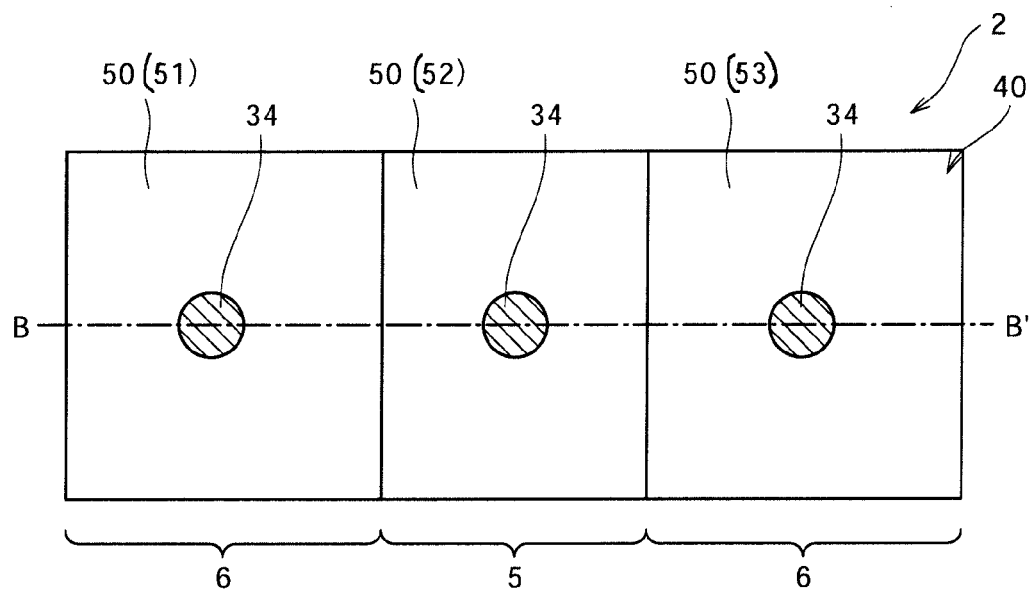
FIGS. 4A and 4B are drawings showing an embodiment (second embodiment) of a liquid crystal display device according to the present invention, FIG. 4A being a plan view of a counter substrate side of a liquid crystal cell of the liquid crystal display device, and FIG. 4B being a sectional view taken along a line B-B' in FIG. 4A.
Figure 4B:
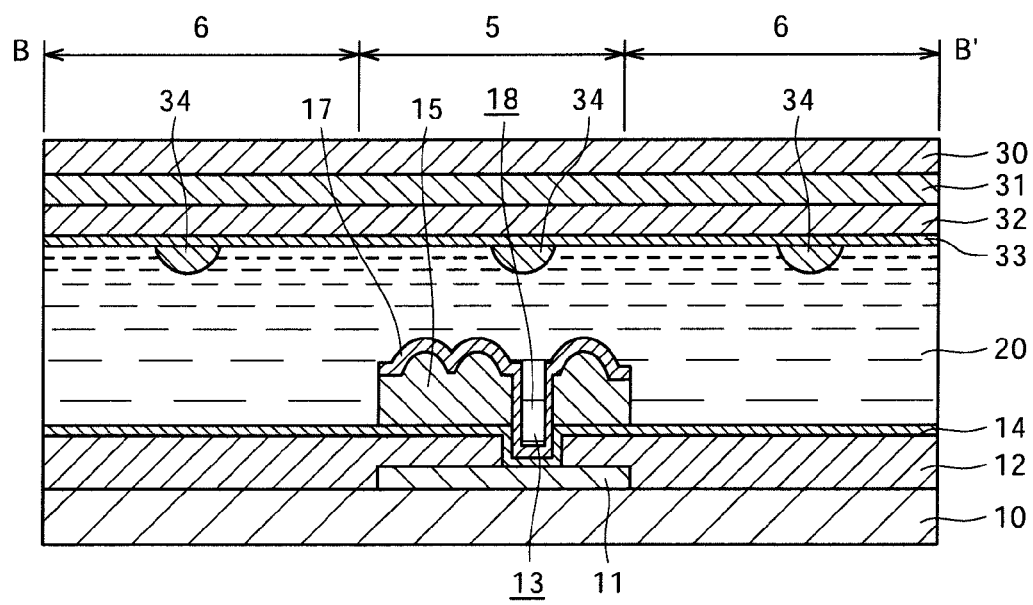

An embodiment (a second embodiment) of a liquid crystal display device according to the present invention will next be described with reference to FIG. 4. FIGS. 4A and 4B are drawings showing a semitransparent type liquid crystal display device as an example of the liquid crystal display device, FIG. 4A being a plan view of a counter substrate side of a liquid crystal cell of the liquid crystal display device, and FIG. 4B being a sectional view taken along a line B-B' in FIG. 4A.

As shown in FIG. 4, the liquid crystal display device 2 has a liquid crystal layer 20 sealed in between substrates 10 and 30 opposed to each other, and includes a plurality of pixels 40 for displaying an image, the pixels 40 having a reflecting section 5 and transmitting sections 6. Each of the pixels 40 includes a plurality of sub-pixels formed by alignment division, for example sub-pixels 50 (51, 52, and 53). An electric connection between the sub-pixels 50 is established by a pixel electrode 14 formed on the substrate 10. Notches 61, for example, are formed in the pixel electrode 14 between the sub-pixels 50. In addition, a gap adjusting layer 15 made of a dielectric is formed on the pixel electrode 14 between the sub-pixels 50 (the pixel electrode 14 between the sub-pixels 50 will hereinafter be referred to as a connecting part 14C).

A color filter layer 31, a planarizing film 32, and a pixel electrode 33 are formed on the substrate (counter substrate) 30 opposed to the substrate 10. An alignment control factor 34 is formed on the pixel electrode 33 (a surface on the liquid crystal 20 side) situated at the center of each of the sub-pixels 50. This alignment control factor 34 is formed by a dielectric, for example.

A configuration will be described concretely. An element layer 11 is formed on the substrate 10 on an element formation side. An insulating film 12 covering the element layer 11 is formed on the substrate 10. A contact hole 13 communicating with the element layer 11 is formed in the insulating film 12. The pixel electrode 14 connected to the element layer 11 via the contact hole 13 is formed on the insulating film 12. The gap adjusting layer 15 for adjusting the thickness of a liquid crystal 20 in the reflecting section 5 is formed on the insulating film 12 on the element layer 11 including a region of connection between the element layer 11 and the pixel electrode 14 with a part of the pixel electrode 14 interposed between the gap adjusting layer 15 and the insulating film 12. This gap adjusting layer 15 is formed by a dielectric of an organic insulating film or an inorganic insulating film, for example.

Thus, the reflecting section 5 is formed by a region having the element layer 11, the insulating film 12 covering the element layer 11, and the gap adjusting layer 15 formed on the insulating film 12 with the part of the pixel electrode 14 interposed between the gap adjusting layer 15 and the insulating film 12. The upper surface of the gap adjusting layer 15 is formed in the shape of gentle irregularities, for example. The surface of the gap adjusting layer 15 thus formed in the shape of gentle irregularities improves a reflection characteristic. Incidentally, the gap adjusting layer 15 and the shape of the irregularities formed in the surface of the gap adjusting layer 15 may be formed continuously with an adjacent pixel.

Further, a contact hole 18 communicating with the contact hole 13 is formed in the gap adjusting layer 15. By thus forming the contact hole 18 in the reflecting section 5, even when the pixel electrode 14 has no notches, a connection between the sub-pixels 50 with weak alignment is made by a contact part, and thus disorder of alignment due to the pressing of the surface of the liquid crystal panel is prevented. A reflecting electrode 17 connected to the pixel electrode 14 via the contact hole 18 is formed on the gap adjusting layer 15. The thus formed reflecting electrode 17 enhances reflection on the gap adjusting layer 15. In addition, because the reflecting electrode 17 is connected to the pixel electrode 14 at edge parts of the gap adjusting layer 15, the reflecting electrode 17 has a function of a pixel electrode on the gap adjusting layer 15. The transmitting section 6 is formed by a region having the insulating film 12 formed on the substrate 10 excluding the reflecting section 5.

In the liquid crystal display device 2, by forming the reflecting section 5 in the central sub-pixel 52 among the sub-pixels 50 (51, 52, and 53) obtained by dividing the pixel 40 into three parts, pixel division is made possible even when the pixel electrodes 14 and 34 have no notches, and it is possible to suppress a decrease in transmission contrast ratio due to a projection and improve the reflection characteristic because the projection parts can be used as reflector. In addition, because there is no connecting part electrically connected to the transmitting sections and the reflecting section as pixel boundary between the sub-pixels 50, alignment disorder due to surface pressing does not occur. Therefore the alignment of the liquid crystal 20, especially the alignment of liquid crystal molecules 20 between the sub-pixels 50 can be stabilized.

Figure 5:
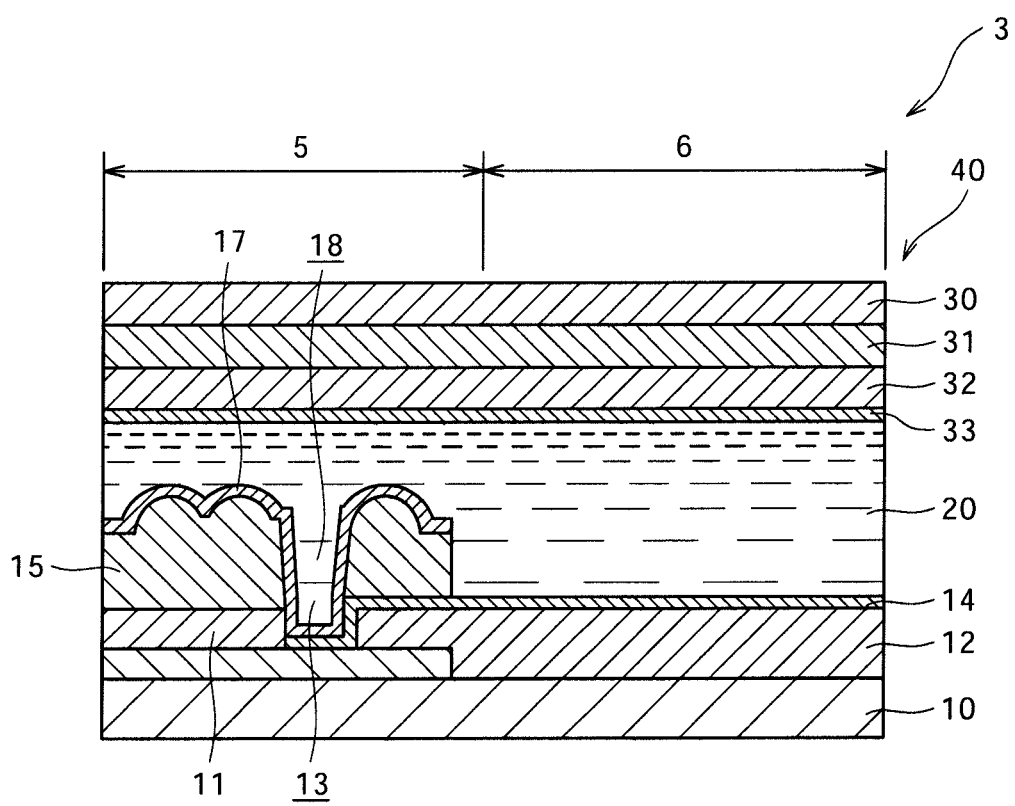
FIG. 5 is a schematic configuration sectional view of an embodiment (third embodiment) of a liquid crystal display device according to the present invention.

An embodiment (a third embodiment) of a liquid crystal display device according to the present invention will next be described with reference to a schematic configuration sectional view of FIG. 5. FIG. 5 is a drawing showing a semitransparent type liquid crystal display device as an example of the liquid crystal display device.

As shown in FIG. 5, the liquid crystal display device 3 has a liquid crystal layer 20 sealed in between substrates 10 and 30 opposed to each other, and includes a plurality of pixels 40 for displaying an image, the pixels 40 having a reflecting section 5 and a transmitting section 6. Each of the pixels 40 includes a plurality of sub-pixels formed by alignment division.

A color filter layer 31 is formed on the substrate (counter substrate) 30 opposed to the substrate 10. A pixel electrode 33 is formed on the upper surface of the color filter layer 31 with a planarizing film 32 interposed between the color filter layer 31 and the pixel electrode 33.

A configuration will next be described concretely. An element layer 11 is formed on the substrate 10 on an element formation side. An insulating film 12 covering the element layer 11 is formed on the substrate 10. A contact hole 13 communicating with the element layer 11 is formed in the insulating film 12. A pixel electrode 14 connected to the element layer 11 via the contact hole 13 is formed on the insulating film 12. A gap adjusting layer 15 for adjusting the thickness of a liquid crystal 20 in the reflecting section 5 is formed on the insulating film 12 on the element layer 11 including a region of connection between the element layer 11 and the pixel electrode 14 with a part of the pixel electrode 14 interposed between the gap adjusting layer 15 and the insulating film 12. This gap adjusting layer 15 is formed by a dielectric of an organic insulating film or an inorganic insulating film, for example.

Thus, the reflecting section 5 is formed by a region having the element layer 11, the insulating film 12 covering the element layer 11, and the gap adjusting layer 15 formed on the insulating film 12 with the part of the pixel electrode 14 interposed between the gap adjusting layer 15 and the insulating film 12. The upper surface of the gap adjusting layer 15 is formed in the shape of gentle irregularities, for example. The surface of the gap adjusting layer 15 thus formed in the shape of gentle irregularities improves a reflection characteristic. Incidentally, the gap adjusting layer 15 and the shape of the irregularities formed in the surface of the gap adjusting layer 15 may be formed continuously with an adjacent pixel.

Further, a contact hole 18 communicating with the contact hole 13 is formed in the gap adjusting layer 15. By thus forming the contact hole 18 in the reflecting section 5, even when the pixel electrode 14 has no notches, a connection between the sub-pixels 50 with weak alignment is made by a contact part, and thus disorder of alignment due to the pressing of the surface of the liquid crystal panel is prevented. A reflecting electrode 17 connected to the pixel electrode 14 via the contact hole 18 is formed on the gap adjusting layer 15. The thus formed reflecting electrode 17 enhances reflection on the gap adjusting layer 15. In addition, because the reflecting electrode 17 is connected to the pixel electrode 14 via the contact hole 18, the reflecting electrode 17 has a function of a pixel electrode on the gap adjusting layer 15. The transmitting section 6 is formed by a region having the insulating film 12 formed on the substrate 10 excluding the reflecting section 5.

The liquid crystal display device 3 provides similar action and effects to those of the above-described liquid crystal display device 1. In addition, because there is no connecting part electrically connected to the transmitting section and the reflecting section as pixel boundary between the sub-pixels, alignment disorder due to surface pressing does not occur.

Therefore the alignment of the liquid crystal layer 20, especially the alignment of liquid crystal molecules between the sub-pixels can be stabilized.

Figure 6:
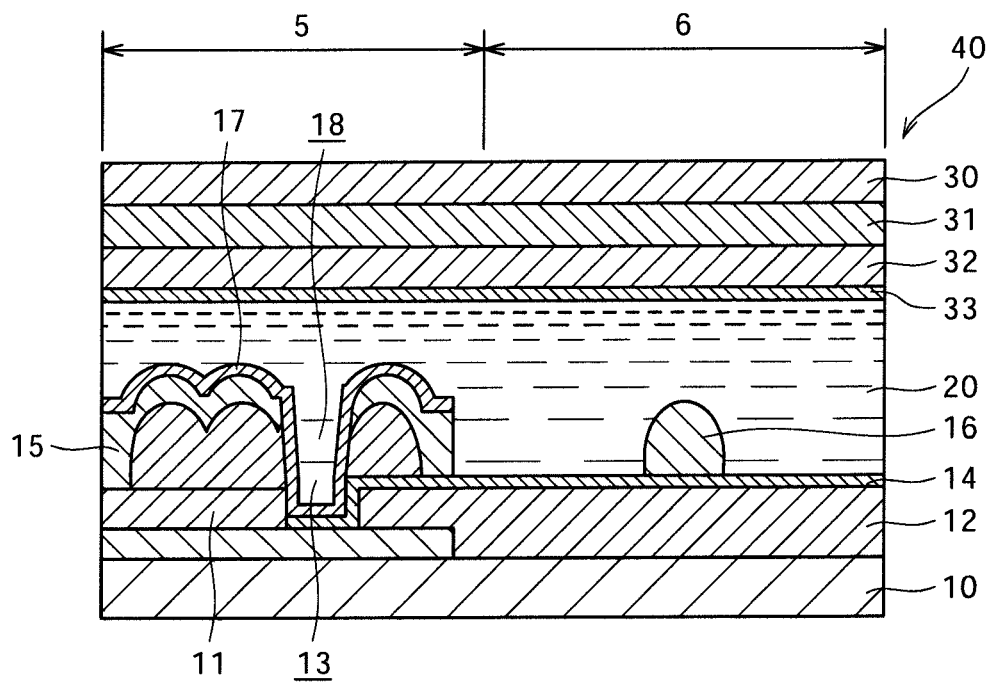
FIG. 6 is a schematic configuration sectional view of an embodiment (fourth embodiment) of a liquid crystal display device according to the present invention.

An embodiment (a fourth embodiment) of a liquid crystal display device according to the present invention will next be described with reference to a schematic configuration sectional view of FIG. 6. FIG. 6 shows a semitransparent type liquid crystal display device as an example of the display device.

As shown in FIG. 6, the liquid crystal display device 3 has a liquid crystal layer 20 sealed in between substrates 10 and 30 opposed to each other, and includes a plurality of pixels 40 for displaying an image, the pixels 40 having a reflecting section 5 and a transmitting section 6. Each of the pixels 40 includes a plurality of sub-pixels formed by alignment division. A dielectric 16 is formed between the sub-pixels in the transmitting section 6 with an insulating film 12 and a pixel electrode 14 formed on the substrate 10 so as to be interposed between the dielectric 16 and the substrate 10.

A color filter layer 36 is formed on the substrate (counter substrate) 30 opposed to the substrate 10. A pixel electrode 32 is formed on the upper surface of the color filter layer 36 with a planarizing film 38 interposed between the color filter layer 36 and the pixel electrode 32.

A configuration will next be described concretely. An element layer 11 is formed on the substrate 10 on an element formation side. An insulating film 12 covering the element layer 11 is formed on the substrate 10. A contact hole 13 communicating with the element layer 11 is formed in the insulating film 12. A pixel electrode 14 connected to the element layer 11 via the contact hole 13 is formed on the insulating film 12. A gap adjusting layer 15 for adjusting the thickness of a liquid crystal 20 in the reflecting section 5 is formed on the insulating film 12 on the element layer 11 including a region of connection between the element layer 11 and the pixel electrode 14 with a part of the pixel electrode 14 interposed between the gap adjusting layer 15 and the insulating film 12. This gap adjusting layer 15 is of a configuration of multiple layers such as two layers or the like, and is formed by a configuration of a plurality of layers of a dielectric such as an organic insulating film or an inorganic insulating film, for example. The gap adjusting layer 15 thus formed by the plurality of layers improves a reflection characteristic.

Thus, the reflecting section 5 is formed by a region having the element layer 11, the insulating film 12 covering the element layer 11, and the gap adjusting layer 15 formed on the insulating film 12 with the part of the pixel electrode 14 interposed between the gap adjusting layer 15 and the insulating film 12. The upper surface of the gap adjusting layer 15 is formed in the shape of gentle irregularities, for example. The surface of the gap adjusting layer 15 thus formed in the shape of gentle irregularities improves a reflection characteristic. Incidentally, the gap adjusting layer 15 and the shape of the irregularities formed in the surface of the gap adjusting layer 15 may be formed continuously with an adjacent pixel.

Further, a contact hole 18 communicating with the contact hole 13 is formed in the gap adjusting layer 15. By thus forming the contact hole 18 in the reflecting section 5, even when the pixel electrode 14 has no notches, a connection between the sub-pixels 50 with weak alignment is made by a contact part, and thus disorder of alignment due to the pressing of the surface of the liquid crystal panel is prevented. A reflecting electrode 17 connected to the pixel electrode 14 via the contact hole 18 is formed on the gap adjusting layer 15. The thus formed reflecting electrode 17 enhances reflection on the gap adjusting layer 15. In addition, because the reflecting electrode 17 is connected to the pixel electrode 14 via the contact hole 18, the reflecting electrode 17 has a function of a pixel electrode on the gap adjusting layer 15.

The transmitting section 6 is formed by a region having the insulating film 12, the pixel electrode 14, the dielectric 16 and the like formed on the substrate 10 excluding the reflecting section 5.

The liquid crystal display device 4 provides similar action and effects to those of the above-described liquid crystal display device 1. In addition, because there is no connecting part electrically connected to the transmitting section and the reflecting section as pixel boundary between the sub-pixels, alignment disorder due to surface pressing does not occur. Therefore the alignment of the liquid crystal layer 20, especially the alignment of liquid crystal molecules between the sub-pixels can be stabilized. Further, the gap adjusting layer 15 formed by the configuration of a plurality of layers such as two layers or the like can improve the reflection characteristic. At this time, any material of the multiple layers may be used for the dielectric 16 disposed on the pixel electrode in the transmitting section 6.

Figure 7:
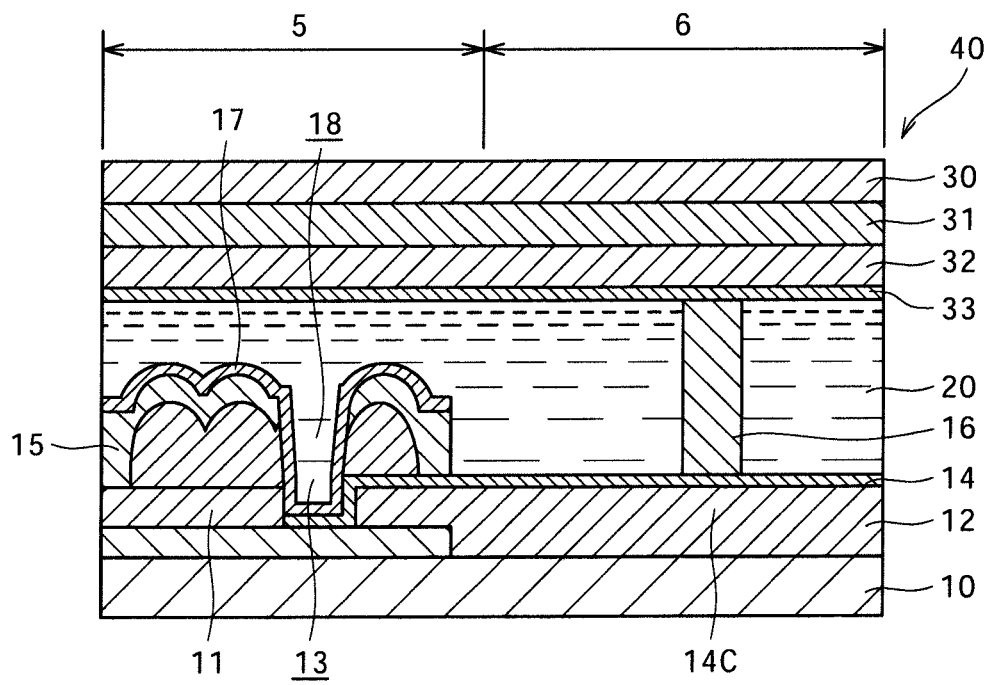
FIG. 7 is a schematic configuration sectional view of an embodiment (fifth embodiment) of a liquid crystal display device according to the present invention.

An embodiment (a fifth embodiment) of a liquid crystal display device according to the present invention will next be described with reference to a schematic configuration sectional view of FIG. 7. FIG. 7 shows a semitransparent type liquid crystal display device as an example of the display device.

As shown in FIG. 7, the liquid crystal display device 5 is obtained by forming the dielectric 16 as a spacer determining a cell gap in the liquid crystal display device 4 described with reference to FIG. 6. The dielectric 16 is thus formed so as to be connected to a pixel electrode 14 on an element side and a pixel electrode 34 on the side of a substrate 30 opposed to a substrate 10 on the element side. Of course, the dielectric 16 is formed on a connecting part 14C made of the pixel electrode 14 between sub-pixels via a pixel electrode 12 on a planarizing film 18 covering an element layer (not shown) formed on the substrate (not shown).

When the dielectric 16 is adjusted in height and used as a spacer for forming a cell gap as in the fifth embodiment, a need for fabricating a photospacer on a color filter side is eliminated, so that the number of processes is reduced. In addition, because the dielectric 16 formed on the electric connecting part 14 between the sub-pixels also serves as a spacer for retaining an interval between the substrates, spacers can be arranged at fixed intervals, so that the substrate interval can be held constant with high precision. Further, the liquid crystal display device 5 provides similar action and effects to those of the above-described liquid crystal display device 1. In addition, because there is no connecting part electrically connected to a transmitting section and a reflecting section as pixel boundary between the sub-pixels, alignment disorder due to surface pressing does not occur. Therefore the alignment of the liquid crystal layer 20, especially the alignment of liquid crystal molecules between the sub-pixels can be stabilized.

The liquid crystal display device described in each of the foregoing embodiments has the dielectric 16 at least on the connecting part 14 for making an electric connection between sub-pixels 50. It is therefore possible to make the sub-pixels 50 electrically independent of each other, and thus stabilize the alignment of the liquid crystal (liquid crystal molecules) 22. Thus, even when the alignment of the liquid crystal is temporarily disordered by pressing the liquid crystal panel, the alignment of the liquid crystal immediately returns to an original state, so that a display defect of a mark being left by pressing the surface of the liquid crystal panel is eliminated.

An embodiment (a first embodiment) of the method of manufacturing a liquid crystal display device according to the present invention will next be described with reference to manufacturing process sectional views of FIGS. 8A to 8G. FIGS. 8A to 8G show a semitransparent type liquid crystal display device as an example of the display device.

Figure 8A:
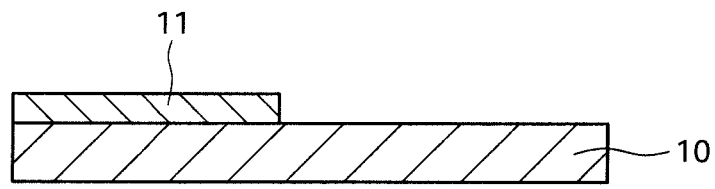
FIGS. 8A to 8G are manufacturing process sectional views of an embodiment (first embodiment) of the method of manufacturing a liquid crystal display device according to the present invention.

As shown in FIG. 8A, an element layer 11 of a switching element formed by a TFT or the like, an auxiliary capacitance line, a gate line, a signal line and the like is formed on a substrate (first substrate) 10.

Figure 8B:
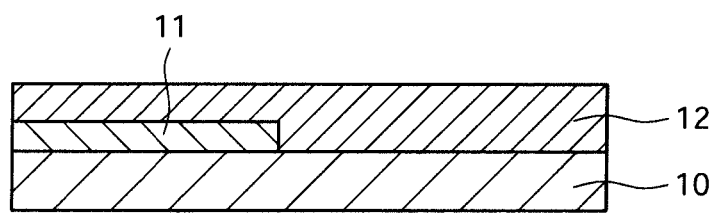

Next, as shown in FIG. 8B, an insulating film 12 made of a planarizing film is formed on the substrate 10 to planarize irregularities attendant on the element layer 11 and the signal line (not shown).

Figure 8C:
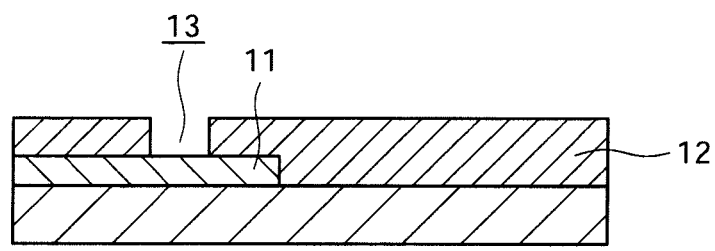

Next, as shown in FIG. 8C, a contact hole 13 communicating with the element layer 11 is formed in the insulating film 12. A transparent resist can be used for the insulating film 12. As such a resist, there is a PC315G made by JSR Corporation, for example. Alternatively, an acrylic organic film, an alicyclic olefin resin, an SOG or the like can be used. A method of coating described above includes a spin coating method, a slit coating method, and the like.

Figure 8D:
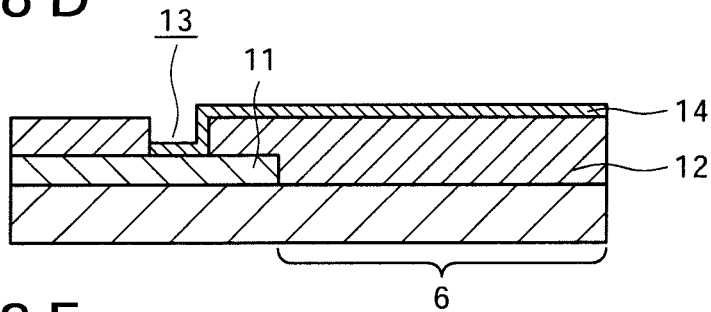

Next, as shown in FIG. 8D, a pixel electrode 14 connected to the element layer 11 via the contact hole 13 is formed as an electrode of a transmitting section 6 on the insulating film 12. This pixel electrode 14 is formed by a transparent electrode such as Indium Tin Oxide (ITO), for example.

Figure 8E:
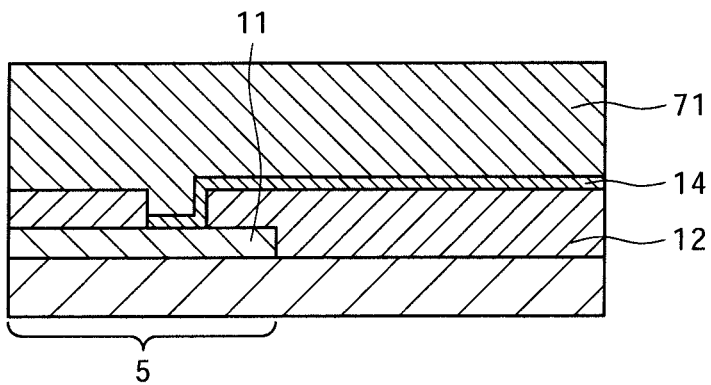

Next, as shown in FIG. 8E, a dielectric film 71 for forming a gap adjusting layer is formed on the insulating film 12 (including the pixel electrode 14) on the element layer 11 in a reflecting section 5. The dielectric film 71 can be formed by a coating method, for example.

Figure 8F:
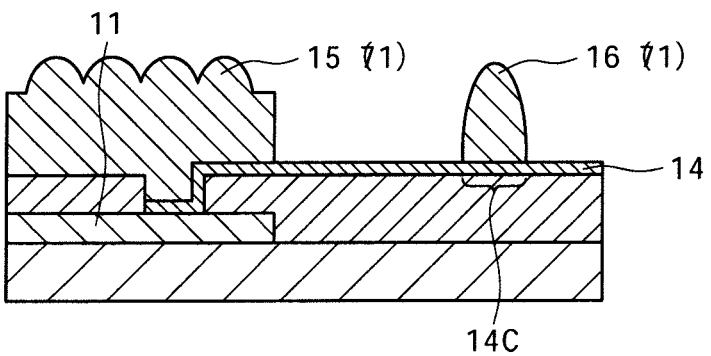

Next, as shown in FIG. 8F, a gap adjusting layer 15 is formed by the dielectric film 71, and a dielectric 16 is formed by the dielectric film 71 on a connecting part 14C between sub-pixels 50. At this time, because the height of the dielectric 16 affects optical characteristics, the height of the dielectric 16 is adjusted. At the time of forming the gap adjusting layer 15, irregularities are formed in the upper surface of the gap adjusting layer 15, and baking is thereafter performed, whereby the irregularities have a rounded shape. By thus forming the gap adjusting layer 15 after forming the pixel electrode 14 connected to the element layer 11 first, the formation of a contact hole communicating with the element layer 11 in the gap adjusting layer 15 is avoided, so that an excellent reflection characteristic is obtained.

Figure 8G:
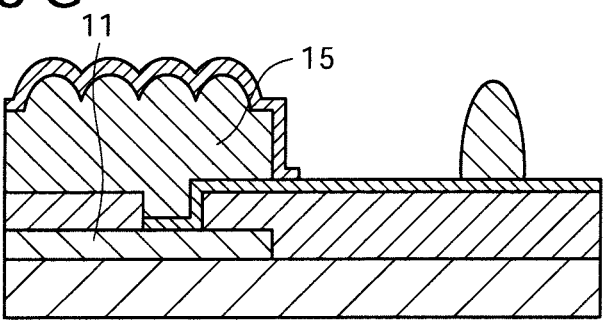

Next, as shown in FIG. 8G, a reflecting electrode 17 connected to the pixel electrode 14 at an edge part of the gap adjusting layer 15 is formed on the gap adjusting layer 15. The reflecting electrode 17 is for example formed by a metallic material having a high reflectivity. For example, the reflecting electrode 17 is formed by a metallic material such as silver (Ag), aluminum (Al) or the like. The reflection characteristic of the reflecting section 5 can be improved by thus forming the upper surface of the gap adjusting layer 15 into the shape of rounded irregularities and forming the reflecting electrode 17 on the surface of the gap adjusting layer 15.

In subsequent processes, an alignment film is formed, the substrates are laminated using a color filter having a spacer formed thereon or a sealing material with a spacer interposed between the substrates, and a liquid crystal is filled between the substrates, whereby a liquid crystal cell is completed. A retardation film and a polarizer are laminated to the liquid crystal cell, whereby the semitransparent type liquid crystal display device according to the present embodiment is manufactured.

An embodiment (a second embodiment) of the method of manufacturing a liquid crystal display device according to the present invention will next be described with reference to manufacturing process sectional views of FIG. 9 and FIG. 9. FIG. 9 and FIG. 9 show a semitransparent type liquid crystal display device as an example of the display device.

Figure 9A:
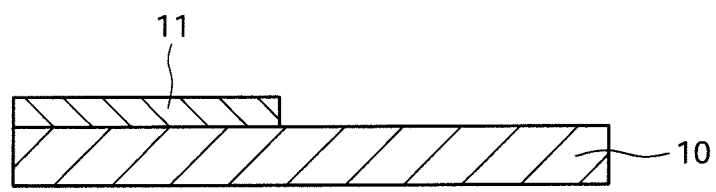
FIGS. 9A to 9G are manufacturing process sectional views of an embodiment (second embodiment) of the method of manufacturing a liquid crystal display device according to the present invention.

As shown in FIG. 9A, an element layer 11 of a switching element formed by a TFT or the like, an auxiliary capacitance line, a gate line, a signal line and the like is formed on a substrate (first substrate) 10.

Figure 9B:
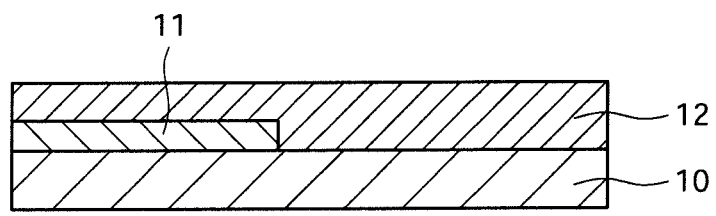

Next, as shown in FIG. 9B, an insulating film 12 made of a planarizing film is formed on the substrate 10 to planarize irregularities attendant on the element layer 11 and the signal line (not shown).

Figure 9C:
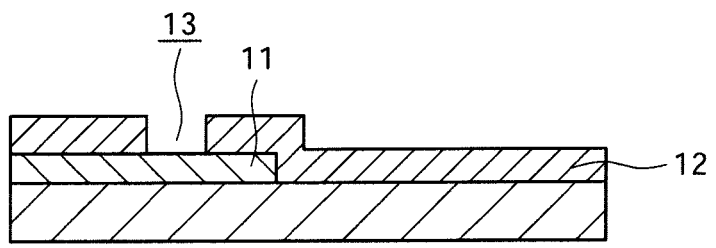

Next, as shown in FIG. 9C, a contact hole 13 communicating with the element layer 11 is formed in the insulating film 12. At this time, a difference in level is provided between the insulating film 12 in a transmitting section 6 and the insulating film 12 in a reflecting section 5. Specifically, the insulating film 12 in the transmitting section 6 is etched and thereby formed to become lower than the insulating film 12 in the reflecting section 5. A transparent resist can be used for the insulating film 12. As such a resist, there is a PC315G made by JSR Corporation, for example. Alternatively, an acrylic organic film, an alicyclic olefin resin, an SOG or the like can be used. A method of coating described above includes a spin coating method, a slit coating method, and the like.

Figure 9D:
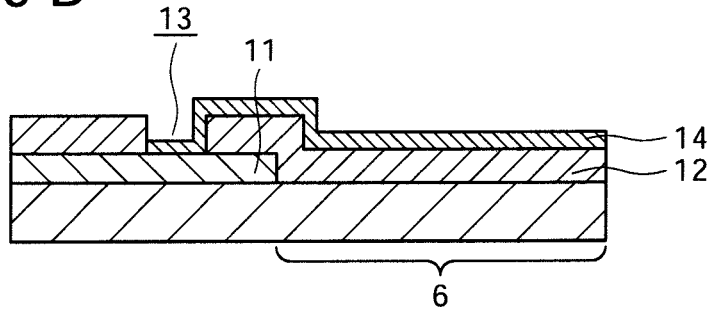

Next, as shown in FIG. 9D, a pixel electrode 14 connected to the element layer 11 via the contact hole 13 is formed as an electrode of the transmitting section 6 on the insulating film 12. This pixel electrode 14 is formed by a transparent electrode such as Indium Tin Oxide (ITO), for example.

Figure 9E:
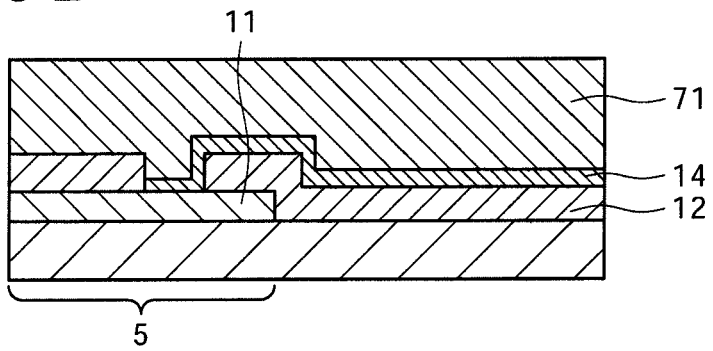

Next, as shown in FIG. 9E, a dielectric film 71 for forming a gap adjusting layer is formed on the insulating film 12 on the element layer 11 in the reflecting section 5. The dielectric film 71 can be formed by a coating method, for example.

Figure 9F:
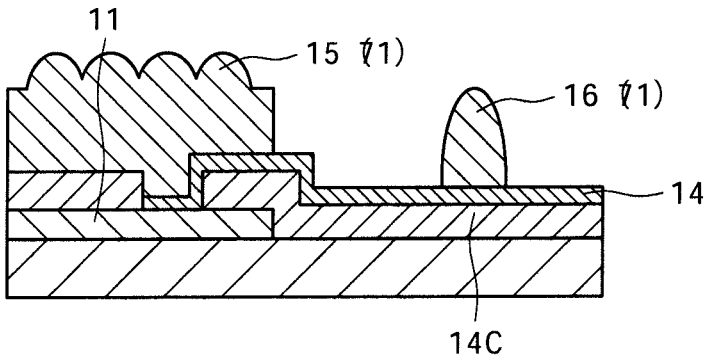

Next, as shown in FIG. 9F, a gap adjusting layer 15 is formed by the dielectric film 71, and a dielectric 16 is formed by the dielectric film 71 on a connecting part 14C between sub-pixels 50. At this time, because the height of the dielectric 16 affects optical characteristics, the height of the dielectric 16 is adjusted. At the time of forming the gap adjusting layer 15, irregularities are formed in the upper surface of the gap adjusting layer 15, and baking is thereafter performed, whereby the irregularities have a rounded shape. By thus forming the gap adjusting layer 15 after forming the pixel electrode 14 connected to the element layer 11 first, the formation of a contact hole communicating with the element layer 11 in the gap adjusting layer 15 is avoided, so that an excellent reflection characteristic is obtained.

Figure 9G:
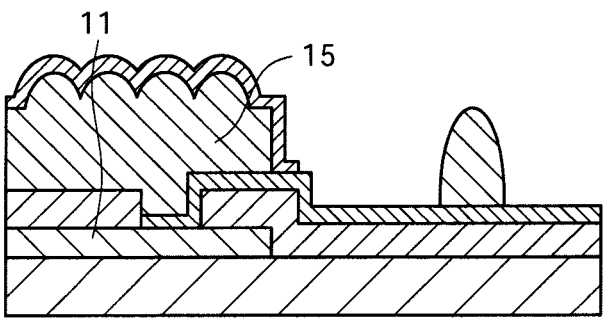
Figure 10A:
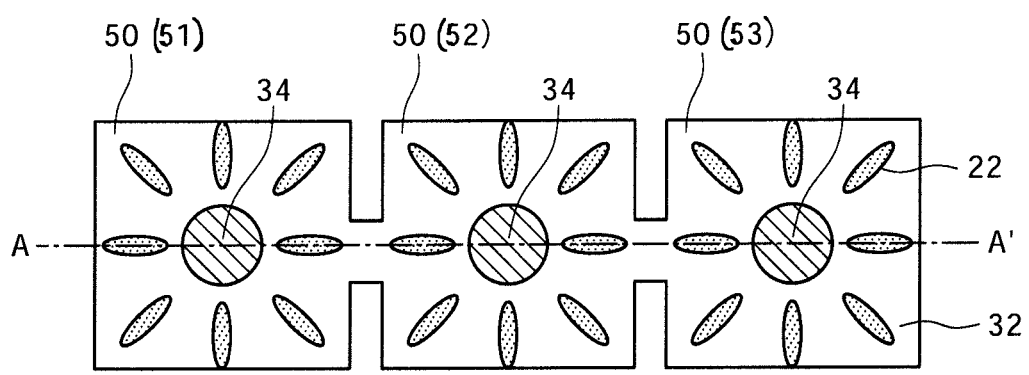
FIGS. 10A and 10B are plan layout schematic views of a liquid crystal display device in related art and a sectional view of principal parts of the liquid crystal display device in related art.
Figure 10B:
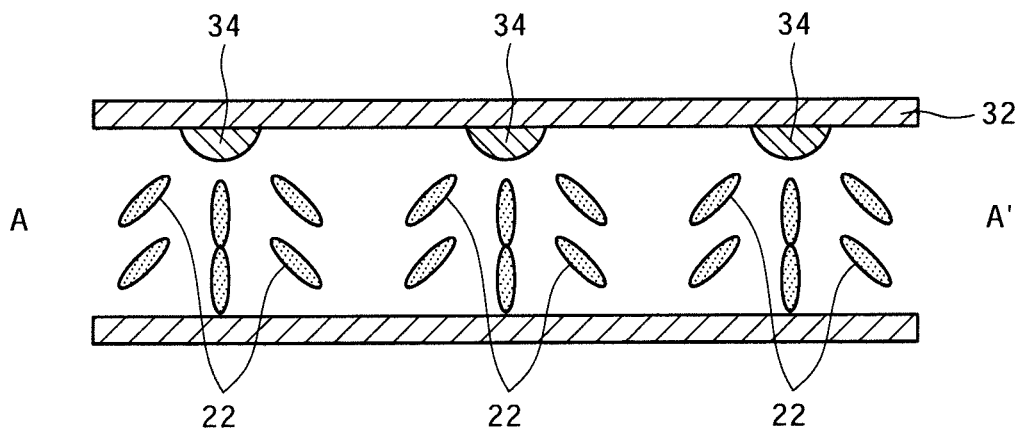
Figure 11A:
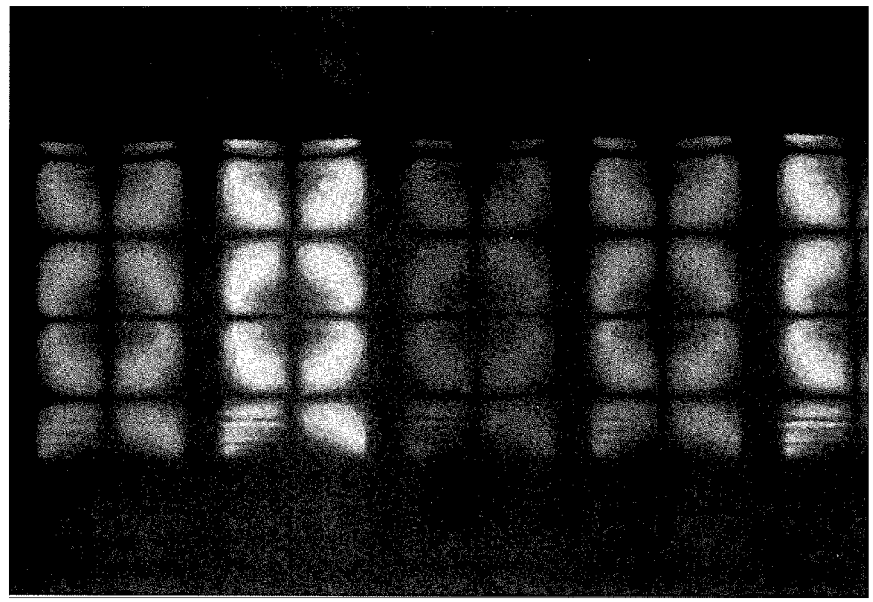
FIGS. 11A and 11B are photographs of pixels in states before and after pressing of the surface of a liquid crystal display panel.
Figure 11B:
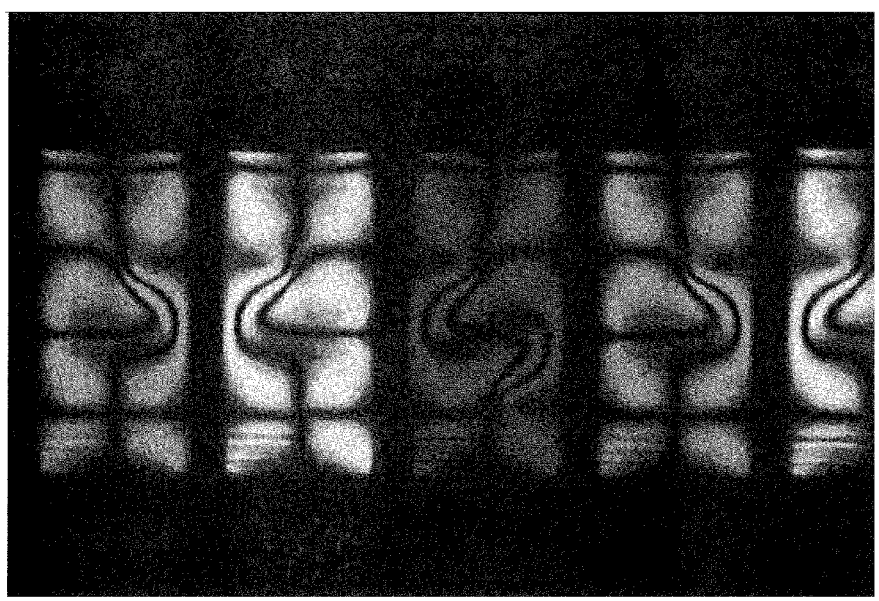
Figure 12:
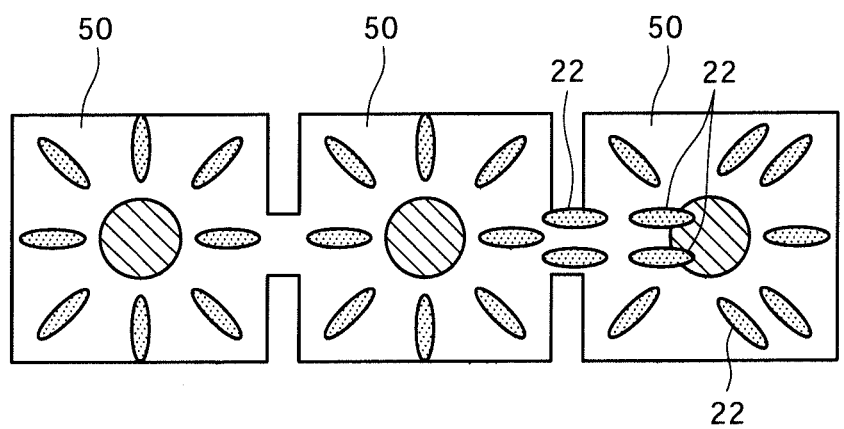
FIG. 12 is a plan layout schematic view of an example of alignment disorder.

Next, as shown in FIG. 9G, a reflecting electrode 17 connected to the pixel electrode 14 at an edge part of the gap adjusting layer 15 is formed on the gap adjusting layer 15. The reflecting electrode 17 is for example formed by a metallic material having a high reflectivity. For example, the reflecting electrode 17 is formed by a metallic material such as silver (Ag), aluminum (Al) or the like. The reflection characteristic of the reflecting section 5 can be improved by thus forming the upper surface of the gap adjusting layer 15 into the shape of rounded irregularities and forming the reflecting electrode 17 on the surface of the gap adjusting layer 15.

In subsequent processes, an alignment film is formed, the substrates are laminated using a color filter having a spacer formed thereon or a sealing material with a spacer interposed between the substrates, and a liquid crystal is filled between the substrates, whereby a liquid crystal cell is completed. A retardation film and a polarizer are laminated to the liquid crystal cell, whereby the semitransparent type liquid crystal display device according to the present embodiment is manufactured.

With the manufacturing method according to the foregoing second embodiment, the film thickness of the dielectric film 71 formed to make the gap adjusting layer 15 can be reduced, so that process efficiency is improved. In addition, the height of the dielectric 16 for alignment control can be controlled, so that the optical characteristics can be optimized.

The manufacturing method according to each of the foregoing embodiments has an advantage of being able to manufacture a liquid crystal display device that can improve display quality because a display defect caused by pressing of the surface of the liquid crystal panel is eliminated. In addition, the dielectric 16 formed on the connecting part 14C for making an electric connection between sub-pixels and the alignment control factor for controlling the alignment of the liquid crystal, which alignment control factor is formed in each sub-pixel, can be minimized in size, so that a liquid crystal display device that can improve transmittance can be manufactured. Further, in related art, a substrate interval (a so-called cell gap) needs to be reduced to enhance resistance to surface pressing. However, because the resistance to surface pressing is improved, the substrate interval can be increased. Therefore a liquid crystal display device having an improved transmittance characteristic can be manufactured.

Further, by simultaneously forming the gap adjusting layer 15 and the dielectric 16 on the electric connecting part 14C resulting from vertical alignment pixel division, it is possible to manufacture the liquid crystal display device that resists alignment disorder due to pressing of the surface of the liquid crystal and which does not need an increase in the number of processes. In addition, in the semitransparent type liquid crystal display device, alignment between the reflecting section 5 and the transmitting section 6 is stabilized, and a panel resisting alignment disorder is obtained. Further, by performing pixel structure division by the gap adjusting layer 15 formed of a dielectric disposed in the reflecting section 5, it is possible to provide a pixel of a high aperture ratio and stable alignment.

It should be understood by those skilled in the art that various modifications, combinations, sub-combinations and alterations may occur depending on designs and other factors insofar as they are within the scope of the appended claims or the equivalents thereof.

What is claimed is:

1. A method of manufacturing a liquid crystal display device, said liquid crystal display device including a plurality of pixels each having a reflecting section and a transmitting section, said pixels each including a plurality of sub-pixels resulting from alignment division, said method comprising the steps of:
    forming an element layer on a substrate;
    forming an insulating film on said substrate such that said insulating film covers said element layer;
    forming a pixel electrode on said insulating film such that said pixel electrode is connected to said element layer; and
    forming a gap adjusting layer on said insulating film on said element layer including a region of connection between said element layer and said pixel electrode;
    wherein said reflecting section is formed by a region having said element layer, said insulating film, and said gap adjusting layer,
    said transmitting section is formed by a region having said pixel electrode formed on said insulating film excluding a region where said gap adjusting layer is formed, and
    a dielectric is formed on said pixel electrode in said transmitting section and a connecting part for making an electric connection between said sub-pixels.

2. The method of manufacturing a liquid crystal display device according to claim 1,
    wherein said insulating film is formed such that a height from a surface of said substrate to a surface of the insulating film in said reflecting section is greater than a height from the surface of said substrate to a surface of the insulating film in said transmitting section.

3. The method of manufacturing a liquid crystal display device according to claim 1, wherein pixel division is performed by forming a dielectric between said sub-pixels.

4. The method of manufacturing a liquid crystal display device according to claim 1, further comprising the step of
    forming irregularities in a surface of said gap adjusting layer.

5. The method of manufacturing a liquid crystal display device according to claim 1, further comprising the step of
    forming a reflecting electrode connected to said pixel electrode on said gap adjusting layer.

6. The method of manufacturing a liquid crystal display device according to claim 1, wherein said gap adjusting layer and said dielectric are formed by an identical layer.

* * * * *